Jan. 13, 1953  J. S. BURRIS  2,625,253
PAGE END INDICATOR MECHANISM FOR TYPEWRITERS
Filed Sept. 22, 1950  2 SHEETS—SHEET 1
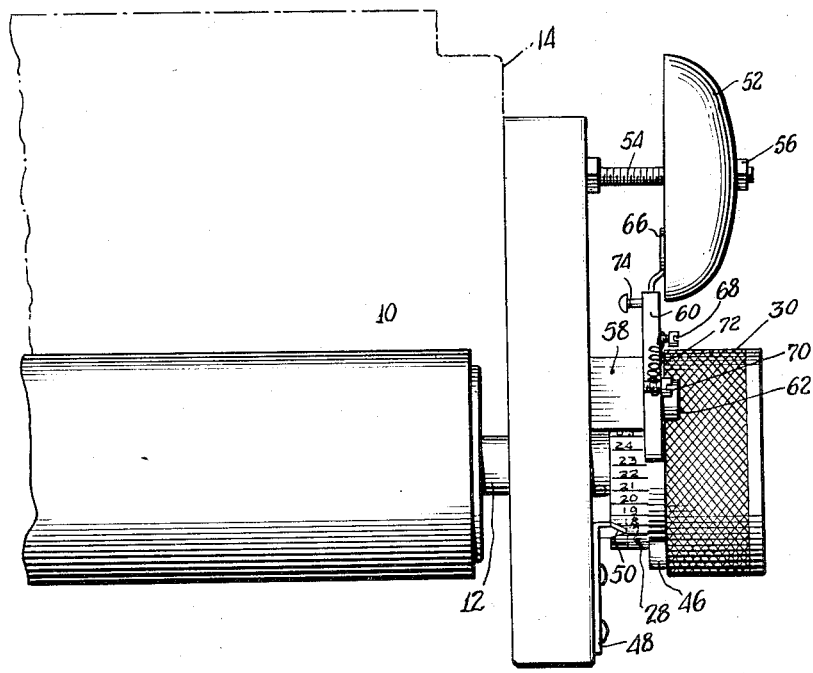
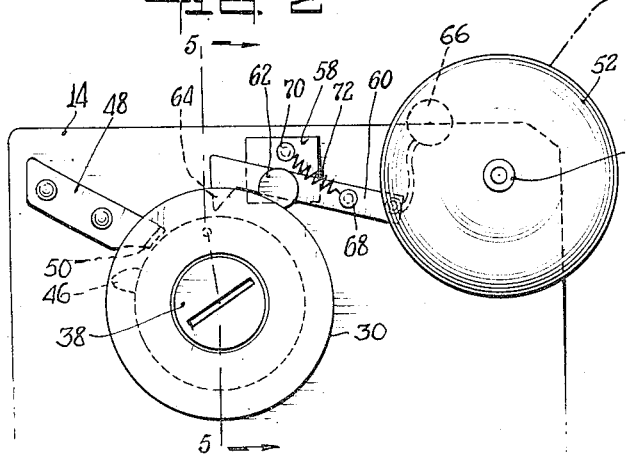
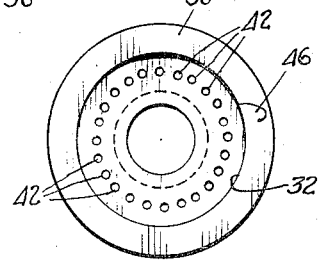
INVENTOR.
John S. Burris
BY
Charles E. Lightfoot
ATTORNEY Jan. 13, 1953        J. S. BURRIS        2,625,253
PAGE END INDICATOR MECHANISM FOR TYPEWRITERS
Filed Sept. 22, 1950        2 SHEETS—SHEET 2
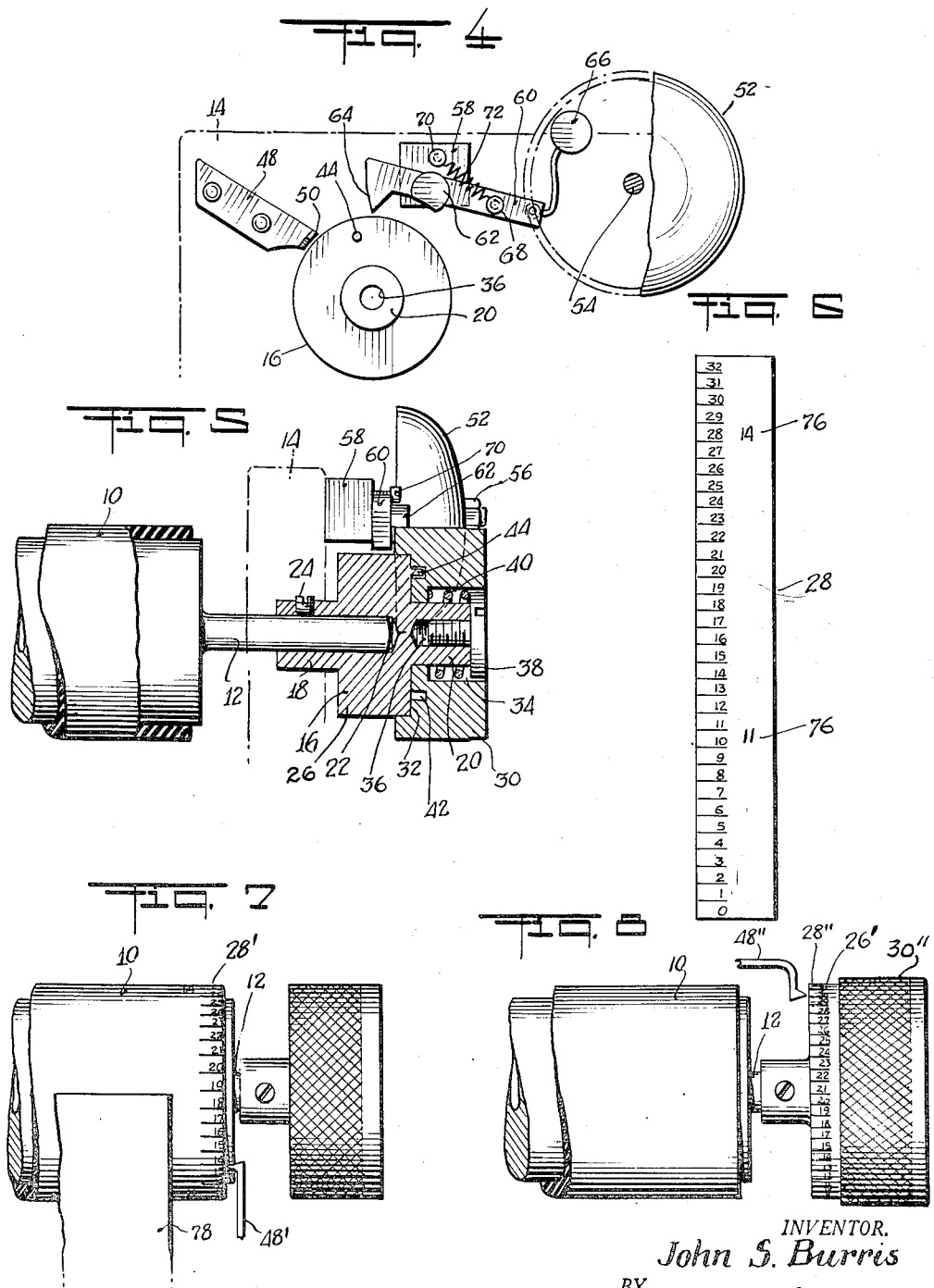
INVENTOR.
John S. Burris
BY Charles E. Lightfoot
ATTORNEY Patented Jan. 13, 1953

2,625,253

UNITED STATES PATENT OFFICE 2,625,253

PAGE END INDICATOR MECHANISM FOR TYPEWRITERS

John S. Burris, Houston, Tex.

Application September 22, 1950, Serial No. 186,158

4 Claims. (Cl. 197—189)

1

This invention relates to indicator mechanism for typewriters, and more particularly to means for indicating at all times the exact position of a sheet of paper in a typewriter and the number of lines remaining available for typing on the sheet.

The invention has for an important object the provision of indicator mechanism for typewriters, which may be adjusted prior to the insertion of a sheet of paper, for indicating when a predetermined position on the sheet has been reached.

Another object of the invention is to provide indicator mechanism for typewriters by which a predetermined margin may be maintained on successive sheets as the same are inserted and typed.

A further object of the invention is to provide mechanism of the kind referred to whereby both top and bottom margins of any desired width may be maintained on a sheet of paper of any length employed in the typewriter.

A further object of the invention is the provision of indicator mechanism for typewriters which may be applied to existing machines without the necessity of altering the structure of the machines in any way.

A still further object of the invention is to provide typewriter indicator means which is of simple design and rugged construction, capable of withstanding the severe conditions of wear and long use to which such devices are customarily subjected.

The above and other important objects and advantages of the invention will be apparent from the following detailed description, constituting a specification of the same, when considered in conjunction with the annexed drawings wherein—

Figure 1 is a top plan view of a portion of a typewriter, showing the invention in its preferred form as applied thereto;

Figure 2 is an end view of the invention as seen in Figure 1;

Figure 3 is a cross-sectional view taken along the line 3—3 of Figure 1;

Figure 4 is an end view similar to Figure 2 partly broken away to show the interior relationship of the parts;

Figure 5 is a longitudinal sectional view taken along the line 5—5 of Figure 2;

Figure 6 is a detail view of the scale used on the indicator, which has been unrolled to show the arrangement of indicia thereon;

Figure 7 is a front elevational view of a portion of a typewriter to which a modified form of the invention is applied; and Figure 8 is a front elevational view of a portion of a typewriter with a further modification of the invention applied thereto.

Referring now to the drawing in greater detail, the numeral 10 indicates the platen of a typewriter having an end shaft 12, which is supported in any convenient bearing structure forming a part of the typewriter, indicated generally at 14. Such platens are customarily furnished with knobs at their ends, attached to the end shafts, and the invention is adapted for attachment to one of the end shafts in place of the knob thereon. In its preferred form the invention comprises a knob structure adapted for attachment to the end shaft of the platen in place of the knob customarily supplied therewith, scale means associated with the knob of the invention, and a bell or similar signal device associated with the indicator mechanism and adapted to ring or otherwise indicate the reaching of a predetermined point on a sheet of paper being typed.

As seen in Figures 1 to 6 inclusive, the preferred form of the invention includes a body 16, having opposite bosses 18 and 20, respectively, extending outwardly axially thereof. The boss 18 is provided with an axial bore which fits the shaft 12, and has a set screw 24, or the like, by which the body 16 may be secured to the shaft in place of the knob usually furnished therewith. The enlarged portion 26 of the body 16, between the bosses 18 and 22, is provided with a scale, indicated in detail in Figure 6, which scale is printed, or otherwise provided with numbers or the like, indicating each line of typing on the sheet being typed, as well as certain other indicia later to be described in detail. This scale, indicated at 28, may be applied to the body in any suitable manner, as by stamping thereon, or printing on a separate strip of material suitably attached to the body.

The operating knob 30 of the indicator mechanism, is preferably formed with a recess 32 adapted to receive the enlarged portion 26 of the body 16. The knob has an axial, outwardly opening recess 34 into which the boss extends, and the boss is provided with a threaded axial opening 36, for the reception of a screw 38. A coil spring 40 is disposed in the recess 34, seated on the bottom of the recess, and beneath the head of the screw 38, whereby the knob is retained on the body, but is axially movable thereon.

At the bottom of the recess 32 the knob 30 is provided with a plurality of inwardly extending bores 42, there being as many such bores as there are divisions along the scale 28. A pin 44 extends outwardly from the body 16, within the recess 32 of the knob, and is adapted to be inserted in any one of the bores 42 as may be desired. It will be readily apparent, that by the construction described, the knob may be moved outwardly from the body 16, compressing the coil spring 40, and the knob may then be moved to any desired position with reference to the scale divisions, so that upon release of the knob the pin 44 will enter the bore 42 at the selected point, and retain the knob in adjusted position.

A signal operating cam 46 is also carried by the knob 30, this cam being in a position to extend over the body 16 at one side of the scale 28 thereon.

A pointer 48 is suitably attached to some fixed portion of the frame of the typewriter, which pointer has a portion 50 extending over the scale 28, to indicate the position of the scale with reference thereto.

The signaling device may conveniently take the form of a bell 52, attached to some fixed portion of the typewriter frame by a screw 54, which may be provided with locking nuts, one of which is indicated at 56, whereby the bell may be adjusted in position toward or away from the frame of the typewriter.

Also mounted on the frame of the typewriter is a filler block 58 suitably attached to the frame and supporting a clapper arm 60 thereon, which clapper arm is pivoted on a screw 62 secured to the filler block. The clapper arm has at one end a downturned cam portion 64, adapted to be engaged by the cam 46 of the knob 30 to operate the clapper arm. At the opposite end the clapper arm carries a clapper 66 in position to strike the bell 52 upon actuation of the clapper arm. A projecting lug or screw 68 is provided on the clapper arm, and a similar lug or screw is secured to the filler block as indicated at 70, these lugs serving for the attachment of a resilient member 72, which is effective to urge the clapper arm toward a position for engagement of the downturned cam 64 with the cam 46 of the knob 30. The clapper 66 is removably attached to the clapper arm by means of a screw 74, or other convenient fastening means, so that the clapper may be adjusted to properly strike the bell upon actuation of the clapper arm.

It will be noted that the scale 28, best seen in Figure 6, has 33 spaces or divisions thereon, representing the number of lines presented on a sheet of paper by a single rotation of the platen 10. Such an arrangement of the scale is, of course, merely illustrative of one standard form of typewriter, and a greater or less number of spaces can be employed, depending upon the size of the platen used and the number of spaces obtainable with any particular type of typewriter. Additional indicia, indicated at 76 in Figure 6 of the drawing, are preferably placed on the scale at suitable points so that the device may be used with sheets of various sizes. The number 14 may, for example, be placed opposite the number 28 on the scale, and the number 11 may be positioned opposite the number 10 on the scale, and these numbers may conveniently indicate the length in inches of the sheet of paper which is being used in the typewriter.

The page length indicia are positioned on the scale at such locations with relation to the line or space numbers that when the scale is moved so that the pointer is on the number indicating the page length, then the pointer will be on zero of the line numbers when the last line of typing on the page is reached.

In making use of the invention, as described above, the scale is first set by rotating the knob 30 until the pointer 50 is opposite the number indicating the number of lines from the bottom of the page which it is desired to use as the margin. After so setting the scale, the cam 46 of the knob is moved to a position immediately behind the cam 64 on the clapper arm, in the position in which the cam 46 occupies immediately after the bell has been rung. In adjusting the cam 46 to the position described, the knob is pulled outwardly against the tension of the spring 40 to withdraw the pin 44 from an engagement with the bores 42, in order that the knob may be rotated without also turning the scale, and when the cam 46 is behind the cam 64 of the clapper arm, the knob is released so that the pin 44 engages in one of the bores 42. The knob is then rotated to bring the pointer 50 opposite the number on the scale which indicates the length of the sheet to be used.

After the mechanism has been set in the manner described, a sheet of paper of the length selected is placed in the typewriter in the usual manner, and the typing is begun. As each line of typing is completed, and the paper is moved to the next line, during the last rotation of the platen, the pointer will indcate on the scale the number of lines remaining before the bottom of the sheet is reached. It will be noted that the scale is divided into the number of divisions representing the number of lines in one rotation of the platen, but the sheet of paper being used may be large enough to accommodate more than the total number of lines on the scale. In such case the bell will ring before the bottom of the paper has been reached, but it will be evident to the operator that the point has not yet been reached where the paper is to be removed, and the typing may be continued until the bell again rings. At the point when the signal indicates that the typing is to be discontinued, the pointer should then indicate the number of lines selected for the margin still remaining at the bottom or the sheet.

It will be evident, also, that the subsequent sheets of paper may be successively placed in the typewriter and typed in the same manner, without the necessity of resetting the indicator device, and in each case the signal will indicate when the bottom of the page has been reached, resulting in a uniform margin remaining on each sheet of paper. It is only necessary to turn the knob to bring the pointer opposite the number indicating the size of the sheet each time a new sheet is inserted, in order to assure that the same margin will be left on each successive sheet of paper of the same size.

In the form of the invention illustrated in Figure 7 a scale of the same character as that shown in Figure 6 may be applied directly to the platen of the typewriter by printing thereon, or otherwise, as indicated at 28'. In this case a pointer 48' may be secured to some convenient portion of the platen carriage, not shown, in order to set the device for use. The sheet of paper is indicated at 78 in Figure 7, inserted in the typewriter preparatory to typing.

To use this form of the invention it is only necessary to move the scale until the pointer indicates on the scale the size of the sheet being used, after which a sheet may be inserted and upon the bottom end of the sheet being reached the pointer will indicate zero on the scale.

A further modification of the invention is illustrated in Figure 8, wherein a scale similar to the scale illustrated in Figure 6, is carried by a cylindrical portion 26' on a knob 30" similar to the knob 30. This scale indicated at 28" may be of a similar character to the scale 28' previously described, and a pointer 48" may be attached to some convenient stationary portion of the frame of the typewriter for indicating a point at which the scale is initially set.

The form of the invention shown in Figure 8 is employed in the same manner as that described in connection with Figure 7, but in this case the scale is carried by the knob 30" which is applied to the shaft 12 of the platen in place of the knob which is customarily furnished with the typewriter. The indicator device may also be used by setting the cam 46 to ring the bell at some convenient point such, for example, as when the pointer is at the number 10 on the line divisions and the cam is left at this point. Thereafter, ringing of the bell will indicate to the typist that there are still 10 lines remaining on the sheet. In all forms of the invention the same scale markings may be used, and when the sheet of paper being used is longer than will be completed in one revolution of the platen, the number of lines remaining will be indicated on the scale during the last revolution of the platen.

It will thus be seen that the invention as described above provides indicator means of simple design, which may readily be applied to any kind of typewriter employing a roller platen, whereby any desired margin may be maintained on the typewritten sheet produced, without the necessity for closely watching the progress of the sheet during the typing operation, or providing marks or other means by which the available space on the sheet may be indicated.

While the invention has been described in connection with certain specific embodiments of the same, it will be understood that this is intended to be illustrative only, and numerous changes can be made in the construction and arrangement of the various parts without departing from the spirit of the invention or the scope of the appended claims.

Having thus clearly shown and described the invention, what is claimed as new and desired to secure by Letters Patent is—

1. In combination with a typewriter having a rotatable platen provided with an axial shaft extending beyond an end thereof, a device for indicating the number of lines available for typing on a page comprising a cylindrical body secured to the shaft and rotatable therewith, an operating knob, means releasably connecting the knob to the body for rotation therewith, said knob being rotatable relative to the body upon release of said releasable means, a signal means carried by the typewriter and means carried by the knob and engageable with the signal means for operating the signal means.

2. In combination with a typewriter having a rotatable platen provided with an axial shaft extending beyond an end thereof, a device for indicating the number of lines available for typing on a page comprising a cylindrical body secured to the shaft and rotatable therewith, said body having a scale thereon, an operating knob, releasable means connecting the knob to the body for rotation therewith, cam means carried by the knob, said knob being rotatable upon release of said releasable means to adjust said cam means with relation to said scale, and signal means carried by the typewriter and engageable by the cam means.

3. In combination with a typewriter having a rotatable platen provided with an axial shaft extending beyond an end thereof, a device for indicating the number of lines available for typing on a page comprising a cylindrical body secured to the shaft and rotatable therewith, said body having a scale thereon, an operating knob, means releasably connecting the knob to the body for rotation therewith, a cam carried by the knob, said knob being rotatable to adjust the position of the cam with reference to the scale upon release of the releasable means, signal means carried by the typewriter and engageable by the cam, and a stationary pointer carried by the typewriter adjacent the scale.

4. In combination with a typewriter having a rotatable platen provided with an axial shaft extending beyond an end thereof, a device for indicating the number of lines available for typing on a page comprising a cylindrical body rotatably carried by the shaft and having a scale thereon, an operating knob carried by the body, releasable means connecting the knob to the body for rotation therewith, a cam carried by the knob, said knob being rotatable independently of the body upon release of the releasable means for adjusting the cam with reference to the scale, a stationary pointer carried by the typewriter adjacent the scale, and signal means carried by the typewriter in a position for operative engagement with the cam.

JOHN S. BURRIS.

REFERENCES CITED

The following references are of record in the file of this patent:

UNITED STATES PATENTS

| Number | Name | Date |
|---|---|---|
| 569,909 | Atwood | Oct. 20, 1896 |
| 1,013,953 | Richardson | Jan. 9, 1912 |
| 1,091,122 | Crowther et al. | Mar. 24, 1914 |
| 1,295,307 | Hawley | Feb. 25, 1919 |
| 1,757,541 | Murdock | May 6, 1930 |